Patented Jan. 23, 1945

2,367,713

UNITED STATES PATENT OFFICE 2,367,713

PROCESS FOR THE NUCLEAR METHYLATION OF AROMATIC AMINES

Abraham Burawoy, Levenshulme, Manchester, England, assignor to The Calico Printers' Association Limited, Manchester, England, a British company No Drawing. Application February 26, 1942, Serial No. 432,532

6 Claims. (Cl. 260—577)

This invention has for its object the provision of a new, efficient and convenient process for the preparation of aromatic amines in which the nucleus is methylated.

According to the invention, such amines are prepared by heating to a temperature exceeding 300° C., a polymeric anhydro-p-amino-aryl alcohol of the general formula $(-RN-Ar-CH_2-)_n$, wherein R is a radical selected from the group consisting of hydrogen, alkyl radicals and aryl radicals, Ar is a radical selected from the group consisting of phenyl and naphthyl radicals, phenyl and naphthyl radicals with alkyl substituent groups, and phenyl and naphthyl radicals with alkoxy substituent groups, the group $-RN-$ being in the para-position to the group $-CH_2-$, and $n$ is an integer greater than unity.

The polymeric anhydro-p-amino-aryl alcohols could also be represented by a quinonoid type of formula, viz. $(RN=Ar=CH_2)_n$, or by a cyclic formula, viz.

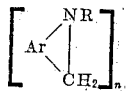

It would then be assumed that on polymerisation the double bonds in the quinonoid formula would disappear, or that the linkage between $-NR$ and $-CH_2$ in the cyclic formula would be broken, so that in either case the extended formula, e. g. for the dimer, would be

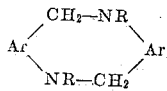

that is the linkages between the monomers would be between the $-CH_2$ group of the one and the $-NR$ group of the other, as is also clearly indicated by the formula $(-RN-Ar-CH_2-)_n$ used herein.

In the following description and examples the compounds in question are referred to simply as anhydro-p-amino-aryl alcohols. They are essentially of a polymeric nature and it will be understood that a polymeric compound is meant in each case.

The anhydro-p-amino-aryl alcohols are most conveniently prepared in known manner by condensing the corresponding primary or secondary amines of the benzene or naphthalene series, in which the p-position to the amino group is free, with formaldehyde in mineral acid medium. This condensation must be carried out at approximately room temperature, because at higher temperatures complex resinous substances are formed which are unsuitable for the process. These resinous substances contain methylene linkages $-RN-Ar-CH_2-Ar-NR-$ and therefore possess a different structure from the compounds $(-RN-Ar-CH_2-)_n$ in which all the linkages between the monomers are believed to be between the $-CH_2-$ group of the one and the $-R-N-$ group of the other.

Other methods by which anhydro-p-aminoaryl alcohols can be prepared include:

(1) Treating with mineral acid anhydro-formaldehyde aniline or its homologues which are obtained from the corresponding amines by condensation with formaldehyde in neutral medium.

(2) Dehydrating p-amino-aryl alcohols of the general formula $R-NH-Ar-CH_2OH$ where R is hydrogen or an aliphatic or aromatic radical and Ar is a substituted or unsubstituted benzene or naphthalene ring, or de-aminating p-amino-aryl amines of the general formula $$R-NH-Ar-CH_2-NR_1R_2$$

where $NR_1R_2$ may be the residue of ammonia or a primary or secondary amine, according to the following reactions:

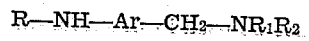

(I) $nRNH-Ar-CH_2OH \xrightarrow{-nH_2O} (-RN-Ar-CH_2-)_n$ (II) $nRNH-Ar-CH_2NR_1R_2 \xrightarrow{-nHNR_1R_2} (-RN-Ar-CH_2-)_n$ The condensation between formaldehyde and aromatic primary or secondary amines referred to above takes place in acid medium. If acid is absent the same amines still react with formaldehyde, but the substitution is effected in the amine group and not in the nucleus, resulting in the formation of compounds such as anhydroformaldehyde aniline $(C_6H_5-N=CH_2)_n$, which, heated to high temperature, yields aniline.

The so-called isomer anhydro-formaldehyde aniline which is obtained by heating anhydroformaldehyde aniline with acid and is believed to be anhydro-formaldehyde-p-amino-benzyl aniline, $C_6H_5-NH-CH_2-C_6H_4-N=CH_2$ also represents a substance which, at an elevated temperature, is capable of forming an anhydro-aminobenzyl alcohol of the general formula $$(-RN-Ar-CH_2-)_n$$

This substance and its homologues, of the general formula $Ph-NH-CH_2-Ph-N=CH_2$, in which Ph is the phenyl radical or a homologue thereof, therefore also form methylated amines on heating, but it is preferred that the heating be done in presence of an alkaline substance, as will be described below.

Other substances, which, at an elevated temperature, are capable of forming anhydro-p-amino-benzyl alcohols of the type $$(-RN-Ar-CH_2-)_n$$

and which may likewise be used in the process according to the invention, in place of the anhydro-p-amino-benzyl alcohols themselves are p-amino-benzyl alcohols of the general formula R—NH—Ar—CH$_2$OH, p-amino-benzylamines of the general formula R—NH—Ar—CH$_2$NR$_1$R$_2$, and di-(p-amino-aryl) sulphides and disulphides of the general formulae (R—NH—Ar—CH$_2$)$_2$S and (R—NH—Ar—CH$_2$—S—)$_2$ which, when heated to a high temperature, at first lose water, the amine HNR$_1$R$_2$ or H$_2$S respectively, and form the corresponding anhydro-p-amino-benzyl alcohol according to the following reactions:

(1) $n$RNH—Ar—CH$_2$OH $\xrightarrow{-nH_2O}$ (—RN—Ar—CH$_2$—)$_n$ (2) $n$RNH—Ar—CH$_2$NR$_1$R$_2$ $\xrightarrow{-nHNR_1R_2}$ (—RN—Ar—CH$_2$—)$_n$ (3) $n$(RNH—Ar—CH$_2$)$_2$S $\xrightarrow{-nH_2S}$ 2(—RN—Ar—CH$_2$—)$_n$ On continued heating the anhydro product then forms the desired methylated amine RNH—Ar—CH$_3$ The yield of the methylated aromatic amines is considerably improved if the heating of the p-anhydro-amino-benzyl alcohol, or of any substance yielding at a higher temperature an anhydro-p-amino-benzyl alcohol is carried out in the presence of alkaline substances, for instance, an alkali selected from the group consisting of the hydroxides, oxides, carbonates, bi-carbonates, acetates, and borates of the alkali-forming metals, that is to say, the alkali and alkaline earth metals and magnesium. These substances act favourably even when used in small amounts, but they may also be used in much larger proportion as a dry diluent in order to facilitate the reaction. The heating can be carried out in several known types of apparatus, but conveniently as a dry distillation. In this case the material is gradually heated up until the amine begins to distil over, and heating is continued until distillation ceases. The residues of the distillation are resinous substances containing less hydrogen than the original materials, having yielded up some of their hydrogen to the methylated aryl amines during the formation of the latter.

In acid medium no commercially practicable yields of the methylated amines can be obtained.

In practice, the temperature employed will normally be over 300° C. and will preferably be between 400 and 500° C.

Some specific examples of the manner in which the process according to the invention is carried out will now be described.

*Example 1*

Anhydro-p-amino-benzyl alcohol (prepared from aniline hydrochloride and formaldehyde) is dry distilled. The distilled oil is fractionated. The lower boiling fractions consist of a mixture of aniline and p-toluidine, which are separated by known methods.

*Example 2*

One part of anhydro-p-amino-benzyl alcohol and one part of sodium carbonate are mixed and dry distilled. The distilled oil is fractionated. The lower boiling fractions consist of almost pure p-toluidine which quickly solidifies.

Instead of anhydro-p-amino-benzyl alcohol, p-amino-benzyl alcohol, prepared by reduction of p-nitro-benzyl alcohol, may be used in Examples 1 and 2 with similar results.

*Example 3*

One part of anhydro-p-amino-benzyl alcohol and one part of calcium hydroxide are heated under reflux for 24 hours. The oil formed is steam distilled. Almost pure p-toluidine is collected.

*Example 4*

One part of anhydro-4-amino-3-toluyl alcohol (prepared from o-toluidine hydrochloride and formaldehyde) and one part of calcium hydroxide are mixed and dry distilled. The distilled oil is fractionated. The fraction boiling below 230° C. consists of almost pure 1.3-4-m-xylidine. A higher boiling fraction was also obtained and identified as 4.4′-diamino-3.3′-ditolyl-methane (M. P. 153° C.)

*Example 5*

As Example 4, but without calcium hydroxide. The lower boiling fraction contains besides 4-m-xylidine, small amounts of o-toluidine.

*Example 6*

Anhydro-4-amino-2-toluyl alcohol, a white powder, is prepared from m-toluidine and formaldehyde in presence of hydrochloric acid. It is heated with an equal amount of magnesium hydroxide in an air bath. The resultant oil is fractionated and a good yield of almost pure 1.2.4.o-xylidine is obtained as low boiling fraction.

*Example 7*

Anhydro-4-amino-2.5-xylyl alcohol, a white powder, is prepared from p-xylidine hydrochloride and formaldehyde. One part of anhydro-4-amino-2.5-xylyl alcohol and one part of sodium carbonate are mixed and dry distilled. The distilled oil is fractionated. It consists of a low boiling fraction of almost pure pseudo-cumidine and a high boiling fraction of 4.4′-diamino-2.2′-5.5′-dixylylmethane (M. P. 143° C.).

*Example 8*

Anhydro-4-amino-2.3-xylyl alcohol, a white powder, is prepared from vic-o-xylidine and formaldehyde in presence of hydrochloric acid. One part of anhydro-4-amino-2.3-xylyl alcohol and one part of sodium carbonate are heated. The oil obtained is fractionated. The low boiling fraction consists of almost pure 1.2.3-trimethyl-4-amino-benzene (B. P. 240° C.; acetyl derivative M. P. 140° C.).

*Example 9*

Equal parts of calcium hydroxide and anhydro-4-amino-3-methoxy-benzyl alcohol (prepared from o-anisidine, formaldehyde and hydrochloric acid) are dry distilled. The oil obtained contains 4-amino-3-methoxy-1-methyl benzene.

*Example 10*

Anhydro-4-amino-naphthyl alcohol, a reddish powder, is prepared from α-naphthylamine, formaldehyde and hydrochloric acid. Dry distillation in presence of calcium hydroxide yields an oil which consists of a mixture of α-naphthylamine and 1-methyl-4-naphthylamine. Separation can be carried out by their picrates.

*Example 11*

Two parts of anhydro-monomethyl-p-aminobenzyl alcohol (prepared from monomethylaniline hydrochloride and formaldehyde) and one part of calcium hydroxide are heated. The oil obtained is fractionated. The fractions boiling below 230° C. consist of a mixture of p-toluidine and monomethyl-p-toluidine.

*Example 12*

One part of p-amino-benzylaniline (prepared from aniline, aniline hydrochloride and formaldehyde) and one part of calcium hydroxide are dry distilled. The oily distillate is fractionated. The low boiling fractions consist of aniline and p-toluidine.

*Example 13*

One part of isomer anhydro-formaldehyde aniline (prepared from anhydro-formaldehyde aniline by treating with glacial acetic acid), is mixed with one part of sodium carbonate and dry distilled. The lower boiling fraction of the oily distillate consists of a mixture of aniline and p-toluidine.

In all the foregoing examples, the temperature to which the materials are finally heated is over 300° C., and the optimum temperature is usually between 400 and 500° C.

It will be understood thtat the foregoing specific description is given by way of example only and that the invention includes all processes lying within the scope of the appended claims.

*Example 14*

One part of di-(p-amino-benzyl) disulphide and one part of calcium hydroxide are mixed and dry distilled. The lower boiling fractions consist of almost pure p-toluidine.

What I claim is:

1. A method of obtaining aromatic amines methylated in the nucleus, comprising heating to a temperature over 300° C. a polymeric anhydro-p-amino-aryl alcohol of the general formula $(-RN-Ar-CH_2-)_n$, wherein R is a radical selected from the group consisting of hydrogen, alkyl radicals and aryl radicals, Ar is a radical selected from the group consisting of phenyl and naphthyl radicals, phenyl and naphthyl radicals with alkyl substituent groups, and phenyl and naphthyl radicals with alkoxy substituent groups, the group $-RN-$ being in the para-position to the group $-CH_2-$, and $n$ is an integer greater than unity.

2. A method as claimed in claim 1 in which the heating is carried out in the presence of an alkali.

3. A method as claimed in claim 1, in which the heating is carried out at a temperature of 400°–500° C.

4. A method as claimed in claim 1, in which the compound of the formula $(-RN-Ar-CH_2-)_n$ is dry-distilled.

5. A method of obtaining aromatic amines methylated in the nucleus, comprising dry distilling at a temperature over 300° C. in the presence of an alkali a polymeric anhydro-p-amino-benzyl alcohol of the formula $(-RN-Ar-CH_2-)_n$ where $n$ is greater than unity.

6. A method of preparing aromatic amines methylated in the nucleus, comprising condensing formaldehyde at room temperature in the presence of a mineral acid with a carbocyclic aromatic amine of the benzene and naphthalene series, in which the para-position to the amino-group is free, to form a polymeric anhydro-p-amino-aryl alcohol, and heating the latter to a temperature over 300° C. until decomposition occurs with formation of an amine having an additional methyl group in the nucleus, in the para-position to the amino-group of the original amine.

ABRAHAM BURAWOY.